United States Patent [19]

Lipkins

[11] 4,367,922

[45] Jan. 11, 1983

[54] PENTAREFLECTORS AND THEIR MANUFACTURE

[76] Inventor: Morton S. Lipkins, 3 Nemeth St., Malverne, N.Y. 11565

[21] Appl. No.: 188,225

[22] Filed: Sep. 17, 1980

[51] Int. Cl.$^3$ .............................................. G02B 5/08
[52] U.S. Cl. ..................................... 350/301; 350/310
[58] Field of Search ........................ 350/299, 301, 310

[56] References Cited

U.S. PATENT DOCUMENTS

| | | | |
|---|---|---|---|
| 1,105,895 | 8/1914 | Eppenstein | 350/301 |
| 1,869,512 | 8/1932 | Schnabl | 350/310 X |
| 2,400,111 | 5/1946 | Gardner | 350/301 |
| 2,430,551 | 11/1947 | Arnold et al. | 350/310 X |
| 2,464,141 | 3/1949 | Maier | 350/310 X |
| 3,663,084 | 5/1972 | Lipkins | 350/299 X |

OTHER PUBLICATIONS

Yoder, Jr., *Applied Optics,* vol. 10, No. 10, Oct. 1971, pp. 2231–2234.

Primary Examiner—F. L. Evans

[57] ABSTRACT

Pentareflectors have optically flat reflecting plates joined to a base plate so that the reflecting surfaces are at 45° to each other and at right angles to a common reference plane. In the disclosed pentareflector, high accuracy is realized at comparatively low cost through use of an additional unifying plate for holding each reflecting plate in precisely determined adjustment. Bonding material joins the parts together but distortion of the reflecting surfaces commonly caused by the bonding material is here avoided. An error-multiplying adjustment method promotes high accuracy.

7 Claims, 10 Drawing Figures

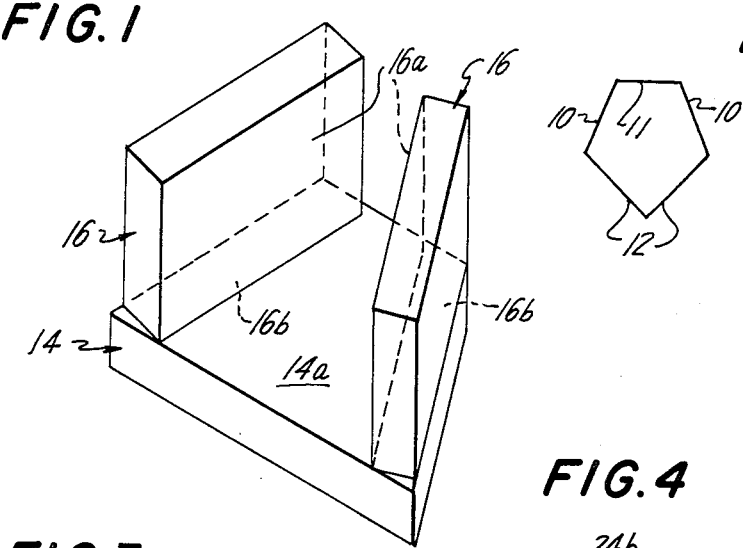
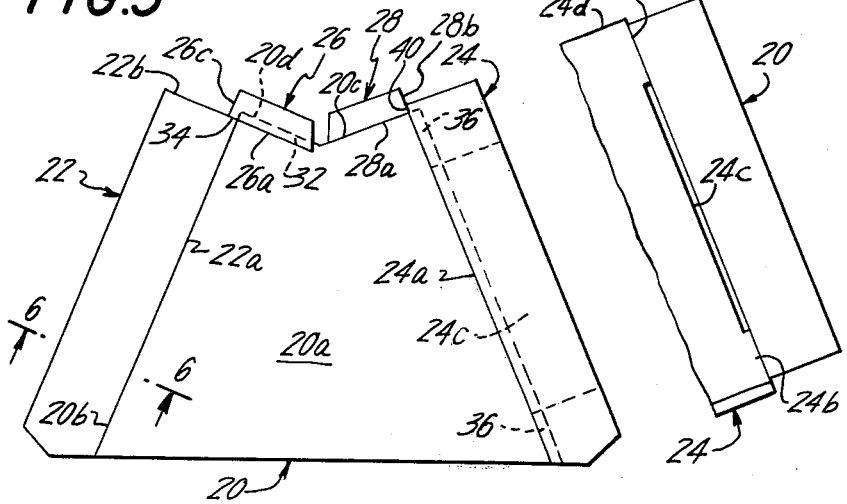
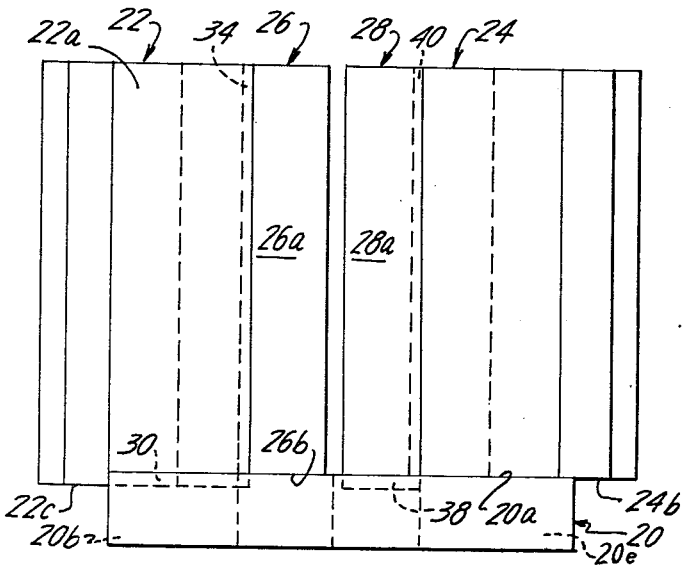
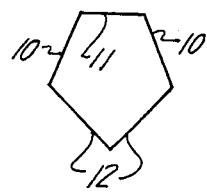
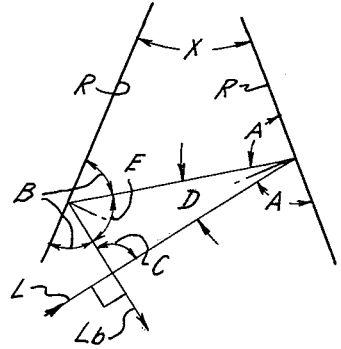
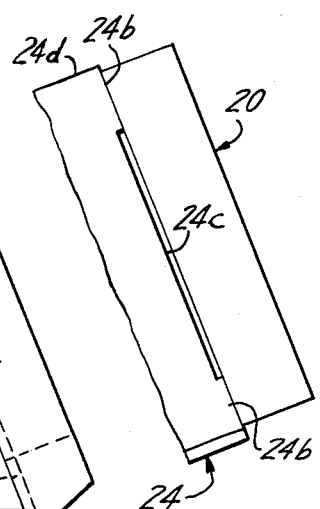
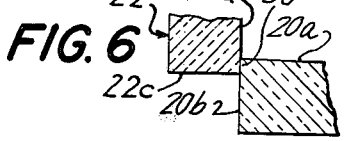
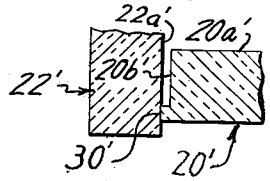
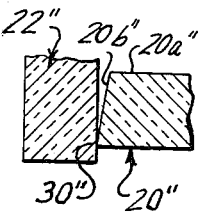
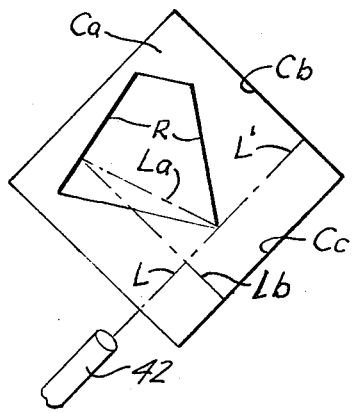

PENTAREFLECTORS AND THEIR MANUFACTURE

The present invention relates to pentareflectors, their manufacture and their testing.

BACKGROUND

Pentareflectors like pentaprisms redirect light so that the rays of an entering beam intersect corresponding exiting rays at right angles without requiring a critical or constant relationship of the pentareflector to the entering beam.

Pentaprisms have internal reflecting surfaces that are not only optionally flat, but both of those surfaces must be precisely 45° to each other and at right angles to a common reference plane.

Pentareflectors commonly have two front-surface reflecting plates mounted on a base plate. Each reflecting plate must meet difficult combined standards, not only of optical flatness but also a critical right-angled relationship between its reflecting surface and its mounting surface. Where there is deviation from the combined standards, there is degradation of the exciting beam as compared to the entering beam or inaccurate redirection of the light, or both. Additionally, there is the further complication of bonding material, when used, producing distortion of the reflecting surfaces when there are defects in the mounting surfaces.

The user of pentaprisms and pentareflectors should have a way of recognizing the reference plane mentioned above, for properly mounting the device in an optical system. In the case of a pentaprism, yet an additional flat surface of the prism serves as the reference plane, both during manufacture and in later use. The lower surface of the base plate of pentareflectors may serve similarly as the reference plane.

SUMMARY OF THE INVENTION

In the novel pentareflectors, precision in shaping the parts is only necessary in providing the required optically flat reflecting surfaces. The extreme difficulty of the past is avoided, i.e., the difficulty of making the optically flat surfaces so as to be precisely at right angles to the mounting surface of each plate. Accordingly, an object of the present invention resides in the provision of pentareflectors of novel construction which avoids the high cost related to meeting the foregoing exacting requirements of flatness and right-angled relationship in each reflecting plate. Instead, an additional unifying plate is added to each reflecting plate, to fix that reflecting plate to the base plate at right angles to a reference plane. The parts are assembled and the required relationships are established by adjustment, not by critical relationships that might be formed between surfaces of each reflecting plate. The parts are united in their precise relationship by bonding material that is confined to stripes that are narrow compared to the customary great thickness of the reflecting plates. In this respect, certain features in the hollow corner-cube reflector of my U.S. Pat. No. 3,663,084 issued May 16, 1972 are usefully applied here.

As will be seen, a novel adjustment procedure is performed in such a manner that observation of certain errors is greatly multiplied, enabling them to be eliminated more rigorously by adjustment. After a first reflecting plate of the pentareflector is assembled to the base plate and adjusted to be exactly at right angles to a reference plane, for example the lower surface of the base plate, the second reflecting plate is assembled and adjusted to be both 45° relative to the first-assembled reflecting plate and at right angles to the reference plane. In this process, an autocollimator is set up to direct its beam at a margin of a reflecting plate of the pentareflector and parallel to the reference plane of the pentareflector after the first plate is in accurate adjustment, and with the second reflector plate approximately in its correct position. A split part of the beam bypasses the pentareflector to reach a test reflector that is set up perpendicular to the beam and, consequently, perpendicular to the reference plane. The split part of the beam of the autocollimator that enters the pentareflector before final adjustment exits approximately at right angles to the entering beam and nearly intersects it. The exiting beam is reflected into the pentareflector by a second test reflector perpendicular to the first test reflector and to the reference plane. That beam is returned to the autocollimator. The second reflector plate of the pentareflector is adjusted so that the beams returned to the autocollimator, by both the pentareflector and the first test reflector, coincide to form a single image in the autocollimator. The repeated reflections that occur cause multiplication of the errors in the pentareflector by a factor of four, facilitating precise adjustment.

One of the reflector plates has an edge surface that is slidable relative to a broad surface of the base plate for enabling angular adjustment of that plate into precise 45° relationship to the other reflector plate, before the edge surface of the reflector plate is bonded to the base plate. Both of the reflector plates can have edge surfaces slidable on the base plate before being bonded to it, but for the plates to be adjustable into precise 45° relationship an edge of at least one of the plates should be opposed to a broad surface of the base plate.

Meeting the requirements of pentaprisms, and of accurate pentareflectors as made heretofore, involves constraints that have limited those devices to relatively small sizes. A further object of the present invention resides in providing pentareflectors that can be produced routinely in much larger sizes than heretofore while maintaining high performance standards.

The nature of the invention, and further objects and novel features and advantages, will be fully appreciated from the following detailed discussion of a prior-art pentareflector and an embodiment of the novel pentareflector and of methods of testing and adjusting the novel pentareflector.

In the drawings:

FIG. 1 is a perspective view of a prior art pentareflector;

FIG. 1A is a plan view of a pentaprism;

FIG. 2 is a diagram representing the operation of pentareflectors;

FIG. 3 is a top plan view of a pentareflector embodying features of the invention;

FIG. 4 is a fragmentary lateral view of the embodiment of FIG. 3;

FIG. 5 is a front elevation of the embodiment of FIG. 3;

FIG. 6 is a fragmentary cross-section viewed from the plane 6—6 in FIG. 3;

FIGS. 6A and 6B are modifications of FIG. 6; and

FIG. 7 is a diagram illustrating a method of testing the accuracy of assembled pentareflector parts, the heavy lines representing reflecting surfaces.

PRIOR ART

FIG. 1A represents a conventional pentaprism. It is a glass solid whose facets 10 are at a 45° angle to each other and bear reflecting material. Facets 12 are clear, and they are polished flat surfaces having an included angle of approximately 90°. Light entering roughly perpendicular to either facet 12 reaches a reflecting facet 10, is reflected toward the other reflecting facet 10, and exits via the other facet 12. The direction of the entering light is charged by an angle of 90°. Rear surface 11 has no function, but its inclusion results in a five-sided solid, hence the term "pentaprism".

Pentareflectors as in FIG. 1 act like pentaprisms (hence "pentareflector"), but two reflecting plates are used instead of the two internally reflecting facets of a pentaprism. The usual construction of accurate pentareflectors is shown in FIG. 1. Base plate 14 is joined to plates 16 having front reflecting surfaces 16a disposed at 45° to each other and at 90° to upper surface 14a of base plate 14.

The basic geometry of pentaprisms and pentareflectors is represented in FIG. 2. Angle X between reflecting surfaces R is 45°. Surfaces R are perpendicular to a common reference plane, the plane of the drawing. A ray of light L enters the space between surfaces R, incident at an acute angle A to a surface R. The reflected light ray La is incident at the other reflecting surface R at an acute angle B. The twice-reflected light ray Lb leaving the device intersects the entering ray L at right angles. This result (see FIG. 2) may be proved as follows:

$$D = 180° - 2A, \ E = 180° - 2B \text{ and } C = 180° - D - E.$$

Therefore:

$$C = 180° - (180° - 2A) - (180° - 2B), \text{ or}$$

$$C = 2A + 2B - 180° \quad \text{(I)}$$

Also,
$$X = 180° - A - B \text{ and}$$

$$2X = 360° - 2A - 2B \quad \text{(II)}$$

Adding I and II gives:

$$C + 2X = 180°. \quad \text{(III)}$$

From III it follows that, if X is 45°, C is 90°.

Changes of angle A and consequent changes of angle B do not affect the perpendicularity of rays L and Lb. The same action takes place with respect to each ray of a beam of parallel rays, convergent rays and divergent rays entering the device in relation to each corresponding exiting ray of such beams. Thus, these devices have the unique characteristic of producing a 90° change in the direction of exiting rays as compared to the corresponding entering rays without requiring any critical or constant relationships between the device and the entering light rays. Of course, any deviation of either or both reflecting surfaces R from optical flatness and any deviations from the described 45° and 90° angles cause impaired resolution or degradation in performance of the device.

Plates 16 (FIG. 1) are thick to restrain within acceptable limits the distortion of their reflecting surfaces resulting from stresses that may be incurred. Mounting surfaces 16b (being edge surfaces of plates 16) are relatively broad and are secured to top surface 14a of base plate 14. This provides secure orientation of plates 16. Surfaces 14a and 16b are lapped and polished optically flat for accurate pentareflectors. Plates 16 are jigged precisely at 45° in relation to each other, and they are secured to base plate 14 while so angled. Surfaces 16a and 16b of each plate 16 are accurately perpendicular to each other so that, when plates 16 are secured to base plate 14, surfaces 16a will be accurately perpendicular to surface 14a. The lower surface of plate 14 is flat and parallel to surface 14a, and serves as the reference plane. Meeting the requirements for optical flatness of any one surface is difficult, but adding the requirement that surface 16b is to be precisely perpendicular to surface 16a entails enormously greater difficulty and cost.

Plates 16 may be united to plate 14 with bonding material that is applied (prior to assembly) to cover the mounting surface 16b. Variation of thickness of the bonding material due to deviation of the confronting surfaces 14a and 16b from optical flatness and irregular patterns of bonding material resulting from incomplete penetration may result in warping stresses and impaired resolution.

The bonding material may be omitted and the parts may be united by molecular attraction, in the following manner. Each surface 14a and 16b is made optically flat within a fraction of a wavelength of light while maintaining accurate perpendicularity between surfaces 16a and 16b of each plate 16, and the parts are then assembled. Plates 16 become united to plate 14 upon contact. Therefore the 45° relationship between surfaces 16a must be accurately established and maintained up to the instant of contact to plate 14.

The exacting requirements mentioned above as to flatness, perpendicularity and 45° angularity result in high cost, the costs rising rapidly with increased size of the pentareflector and with requirements for sharper resolution.

THE ILLUSTRATIVE EMBODIMENT

FIGS. 3-5 show an illustrative embodiment of features of the invention. For equal size and resolution, the illustrated pentareflector can be produced much more easily and hence at greatly reduced cost than a pentareflector as in FIG. 1. As a corollary, pursuant to the invention it becomes practical to produce high-resolution pentareflectors of much larger sizes than heretofore.

In FIGS. 3-5, base plate 20 is united to two reflector plates 22 and 24 having optically flat reflecting surfaces 22a and 24a. These surfaces are aluminized, i.e. they bear bright reflecting very thin films of vapor-deposited metal such as aluminum. Unifying plates 26 and 28 are rigidly fixed to plates 20 and 22, and to plates 20 and 24, respectively. The unifying plates maintain reflecting surfaces 22a and 24a perpendicular to a common reference surface, for example the lower surface of base plate 20. The reflecting plates diverge at the front where they are far apart and where the beam is to enter and exit. The reflecting plates converge at the back. Plates 26 and 28 are located at the rear or converging ends of plates 22 and 24. Plate 20 has a broad edge surface 20b, and plate 22 has a broad edge surface 22b. A marginal portion 30 of surface 22a abuts surface 20b of thick base plate 20. These plates may be secured together by a bonding cement such as epoxy glass-bonding preparations. Strip 30, which is covered by bonding material, is narrow as compared to the width of edge surface 20b and as compared to the thickness of plate 22.

In an example, plates 22 and 24 may be 2½ inches wide by 2¾ inches high, and ½-inch thick. In this example, plate 20 may be ½ inch thick, and the bonding material may be limited to narrow marginal portion 30, for example only 1/16-inch wide.

Unifying plate 26 has a lower edge surface 26b that is reasonably flat and perpendicular to its front surface 26a. Part of lower edge surface 26b of plate 26 abuts and is bonded to a narrow marginal portion 32 of surface 20a. For example, marginal portion 32 may be 1/16-inch wide and plate 26 may be ¼-inch thick.

Edge surface 22b of reflecting plate 22 is abutted by a narrow marginal portion 34 of surface 26a where bonding material unites these plates.

In each instance, the broad surface 20a, 22a and 26a of one of these plates is abutted in a narrow band or strip by part of an edge surface of another of these plates. Each joint comprises a marginal portion of only one edge surface and only one broad face of the joined plates. This configuration makes it unnecessary to make edge surface 20b optically flat, or to make surface 20b accurately perpendicular to surface 20a, and the same can be said of each of the other plates of the device.

The bond along marginal portion 30 secures plates 20 and 22 together without risk of significant warping stresses but there is no dependence on this bond or joint to maintain perpendicularity of reflecting surface 22a and the lower surface of plate 20 (the reference surface). Instead, that perpendicularity is established by adjustment (see below) and is thereafter maintained by unifying plate 26.

Plates 20, 22 and 26 are assembled in an adjustable jig, they are adjusted to the described relationships, bonding material is applied, and the parts are held in adjustment until the bonding material is at least partly cured.

Parts 20, 22 and 26 may be rearranged with all the advantages of the described construction. Thus, a narrow portion of edge surface 22c can abut and be bonded to a marginal portion of surface 20a, a narrow portion of edge surface 20d can abut and be bonded to a narrow marginal portion of surface 26a and a narrow portion of edge surface 26c can abut and be bonded to a narrow marginal portion of surface 22a.

Plates 20, 24 and 28 may be united by bonding material confined to narrow marginal portion(s) 36 of surface 20a, narrow marginal portion 38 of surface 28a and narrow marginal portion 40 of surface 24a. Surfaces 20a, 28a and 24a are abutted by edge surfaces 24b, 20c and 28b, respectively, of plates 24, 20 and 28. In the foregoing, edge surfaces 20b and 20d are roughly at right angles, as are edge surfaces 20c and 20e, edge surfaces 22b and 22c, and edge surfaces 24b and 24d.

As already noted, the bonded interface 36 is limited to a narrow portion of the thickness of plate 24. As a result, it is not necessary to make surface 24b precisely perpendicular to surface 24a. The broad surface 24a of plate 24 may be adjusted perpendicular to surface 20a and plates 20 and 24 may be united by bonding material in marginal portion(s) 36 without developing significant bending or warping stresses.

Edge surface 24b is divided into two areas (FIG. 4) by relieved surface 24c. This relief subdivides marginal portion 36 into two small bonding areas spaced far apart. This further reduces the possibility of the bonding material developing plate-distorting stresses when the plates are adjusted and bonded together. It is considered that each other edge surface 20b, 20c, 22b, 26b and 28b may have a relief like relief 24c for further assurance of avoiding deforming stresses that might be induced by the bonding material.

FIG. 6 shows the detail of a typical abutment between two plates. Edge surface 20b abuts the optically flat reflecting surface 22a of plate 22. Abutment of reflecting surface 22a against edge surface 20b is limited to narrow marginal portion 30. Only a small part of the width of edge surface 20b is involved. The bonds of unifying plate 26 to plates 20 and 22 dominate the narrow bond 30 in fixing the angle between reflecting surface 22a and base plate 20. For abutment(s) 36 to be narrow at both its ends, edge surfaces 20b and 20e should form an angle of roughly 45°.

Bonding material such as an epoxy formulation especially suitable for glass is applied in the open corner formed by surfaces 20b and 22c. The bonding material is drawn by capillary action into strip 30 where the edge surface of plate 20 abuts the reflecting surface of plate 22. When set, the bonding material along marginal portion 30 provides ample joint strength. To further minimize warping stresses, the excess of the bonding material that may remain accessible externally should be wiped away while it is fluid.

FIG. 6A shows a modification of FIG. 6, where the bonded interface of plates 20' and 22' is made narrow compared to the thickness of plate 22'. In FIG. 6A, there is no need to limit overlap of surfaces 20b' and 22a', since the step formed on surface 22b' (as shown) results in a narrow marginal strip 30' of surface 20a' being abutted by and being bonded to the land of the step. That land is made reasonably flat and perpendicular to surface 20a', and the step may be relieved along its length (see relief 24c) for minimizing even weak warping stresses that might develop.

FIG. 6B shows yet another way to limit to a very narrow strip the width of bonding material uniting the plates. Edge surface 20b" intersects surface 20a" at an obtuse angle and intersects the opposite surface at an acute angle. As a result, plate 20" abuts plate 22" theoretically along a line 30". Bonding material may be applied as a bead along the abutment at the inside corner formed by the lower surface of plate 20" and the abutted surface of plate 22", limited to form a narrow zone of bonding material.

In each of FIGS. 6, 6A and 6B, the narrow strip of bonding material joining the base plate 20 to each reflecting plate (22 and 24) is relied on solely for holding the plates together. Plates 22 and 24 are held erect by unifying plates 26 and 28. The narrow joints of zones 30 and 36 avoid the consequence of making each abutting surface 20b and 24b less than truly flat and perpendicular to its adjoining reflecting face 20a and 24a.

Referring to FIG. 7, an expeditious and highly accurate method of testing pentareflectors may now be described. The parts advantageously are held in an adjustable jig during the test, so that the desired relationship can be established with precision before the parts are unified by the bonding material.

A hollow corner-cube is shown in FIG. 7 having a horizontal optically flat surface Ca and two vertical optically flat highly reflecting surfaces Cb and Cc, all three being mutually perpendicular to a high order of precision. If surface Ca is reflecting the corner cube may be tested by directing the beam of an autocollimator toward the point where all three surfaces intersect. A single sharp image of the autocollimator's reticle should be observed when a precise hollow corner-cube reflector is tested in this way.

Autocollimator 42 is then fixed in position with its beam directed perpendicular to reflecting surface Cb, again tested and adjusted until a single image of the reticle is observed. The beam of the autocollimator is accordingly parallel to surface Ca.

In a first operation, plates 20, 22 and 26 may be assembled as in FIG. 3–5 with rough accuracy in an adjustable jig and this assembly may then be placed on surface Ca. The lower surface of plate 20 may rest on surface Ca, or three identical spacers may separate surface Ca from the lower surface of base plate 20. (When the lower surface of base plate 20 is used as the reference plane in the adjustment process, that lower surface can later be used as the reference plane when mounting the pentareflector in an optical system.) The assembly may be positioned so that the reflecting surface 22a of plate 22 is approximately perpendicular to the beam of the autocollimator. After proper adjustment of plate 22, the autocollimator will have but one image of its reticle. The reflecting surface 22a is than at right angles to the reference plane of the pentareflector. Parts 20, 22 and 26 may then be unified by bonding material as already described.

The diagram of FIG. 7 is highly effective for testing the accuracy of a pentareflector. Autocollimator 42 is adjusted to direct its beam perpendicular to reflecting surface Cb, by steps reviewed above. The beam is then inherently parallel to surface Ca. A pentareflector is then moved into the position shown, with one reflecting surface R intercepting and splitting the beam and with the reference surface of the pentareflector against surface Ca. Part of the beam reaches reflector Cb, it is reflected, and it reenters the autocollimator. Due to previous adjustment, the image produced by the reflected beam from surface Cb coincides with the reticle, constituting a reference image. The intercepted part of the beam is reflected from the first surface R as beam La and after being reflected by the second surface R, beam Lb exits from the pentareflector. It is reversely reflected by surface Cc which is precisely perpendicular to both surfaces Ca and Cb. The beam reenters the pentareflector to be reflected twice by the two surfaces R, and returns to the autocollimator. The returning beam produces an image that coincides with the reference image, i.e. there is only one image, if the pentareflector is in adjustment.

The test represented in FIG. 7 may be used to perfect the adjustment of a pentareflector of the form in FIGS. 3–5. This test is performed after one reflecting plate (22) has been secured to base plate 20 with its reflecting surface (22a) perpendicular to the reference plane, the lower surface of plate 20 in the above description of the adjustment of plate 22. Plate 20 is placed with its lower surface on surface Ca directly or separated from surface Ca by three identical spacers distributed at apices of an imaginary triangle. The same reference surface is used in this test as the reference surface previously used in adjusting plate 22. Plates 24 and 28 are assembled to the unit 20-22-26 in a jig with the parts approximately in their correct relationship. The position of this assembly is adjusted on surface Ca until a margin of plate 24 at the entrance of the pentareflector intercepts part of the beam. The intercepted part of the beam is reflected as described before, to enter and leave the pentareflector, then to be reversely reflected by surface Cc to reenter the pentareflector, and the exiting beam finally reenters the autocollimator. If the image of the reticle in the autocollimator produced by the beam leaving the pentareflector is above or below the reference image, plate 24 needs adjustment to be perpendicular to the reference plane. If the image of the reticle produced by the reentering beam is to be right or left of the reference image, the plate 24 needs adjustment in the sense of establishing the 45° relationship between the reflecting surfaces 22a and 24a. The adjustment is complete when only one image of the reticle is seen in the autocollimator. The parts can then be united by bonding material. The test is especially sensitive because errors in the pentareflector are multiplied by four when measured by the separation between the reference image of the reticle and the image produced by the beam returned from the pentareflector.

A modified procedure may be used for adjusting plate 22 to be perpendicular to the lower surface of the base plate as the reference plane. In preparation for this procedure, the upper and lower surfaces of plate 20 are made exactly parallel, within part of a wave-length of light. This is not very difficult. Upper surface 20a is aluminized so that it is a good reflector. Plates 20, 22 and 26 are then assembled in an adjustable jig with these parts approximately in their desired relationship. An autocollimator is aimed perpendicular to the line where the planes of surfaces 20a and 22a intersect. Assuming that line to be horizontal, side-to-side misalignment of the reflected image relative to the reticle in the autocollimator serves as a guide to enable adjustment of the autocollimator to be perpendicular to that line of intersection. Up-and-down misalignment of two reflected test images of the reticle indicates that the reflecting surfaces 20a and 22a are not perpendicular to each other. Perpendicularity is established when the images coincide. This test for perpendicularity is more sensitive than the test described above in which reflecting surface Cb is used between in this test there is a two-to-one multiplication of error as represented by the displacement between the two test images of the reticle in the autocollimator.

In the foregoing specification, presently preferred embodiments of a novel pentareflector, its manufacture and test procedures have been described. However, these embodiments are subject to modification and varied application by those skilled in the art. Consequently, the invention in its various aspects should be broadly construed in accordance with its true spirit and scope.

What is claimed is:

1. A pentareflector, including a base plate having an essentially flat reference surface, first and second reflector plates having respective optically flat reflecting surfaces that converge at 45° in relation to each other, each reflecting surface being disposed at 90° to said reference surface of said base plate, each said reflector plate extending upward from the upper surface of the base plate and meeting said base plate at a respective joint wherein a said surface of one of the plates of each joint abuts an edge surface of the other plate of that joint and is united thereto by bonding material confined to a zone that is narrow compared to the thickness of the plates, and a pair of unifying plates, each unifying plate being bonded to a respective one of said reflecting plates and to said base plate.

2. A pentareflector as in claim 1, wherein said unifying plates are disposed at the convergent ends of said reflector plates.

3. A pentareflector as in claim 1, wherein said base plate has accurately parallel top and bottom surfaces and wherein said upper surface of the base plate is optically flat and is aluminized.

4. A pentareflector as in claim 1, wherein at least one of said reflector plates has an edge surface slidably engageable with only a marginal portion of said upper surface of the base plate when being adjusted into 45° angularity relative to the other said reflecting plate before said one reflector plate is bonded to said base plate, said marginal portion being narrow relative to the thickness of said reflector plate.

5. A pentareflector as in claim 1, wherein the reflecting surface of at least one of said reflector plates has a narrow zone compared to the thickness of said one reflector plate abutted by and bonded to an edge surface of one of said unifying plates and wherein said one unifying plate has a broad surface abutted by and bonded to an edge surface of said base plate.

6. A pentareflector as in claim 1, wherein each said plate has a broad surface such as the reflecting surfaces of said reflector plates and said upper surface of said base plate, each said plate having an edge surface abutting a broad surface of another one of said plates and having its broad surface abutted by an edge surface of another of said plates.

7. A pentareflector as in claim 6, wherein the bond of each said reflector plate to another said plate extends along said reflector plate and wherein the bond is narrow compared to the thickness of the related reflector plate.

* * * * *